R. A. RYNERSON.
Combined Land-Roller and Clod-Crusher.
No. 210,150. Patented Nov. 19, 1878.
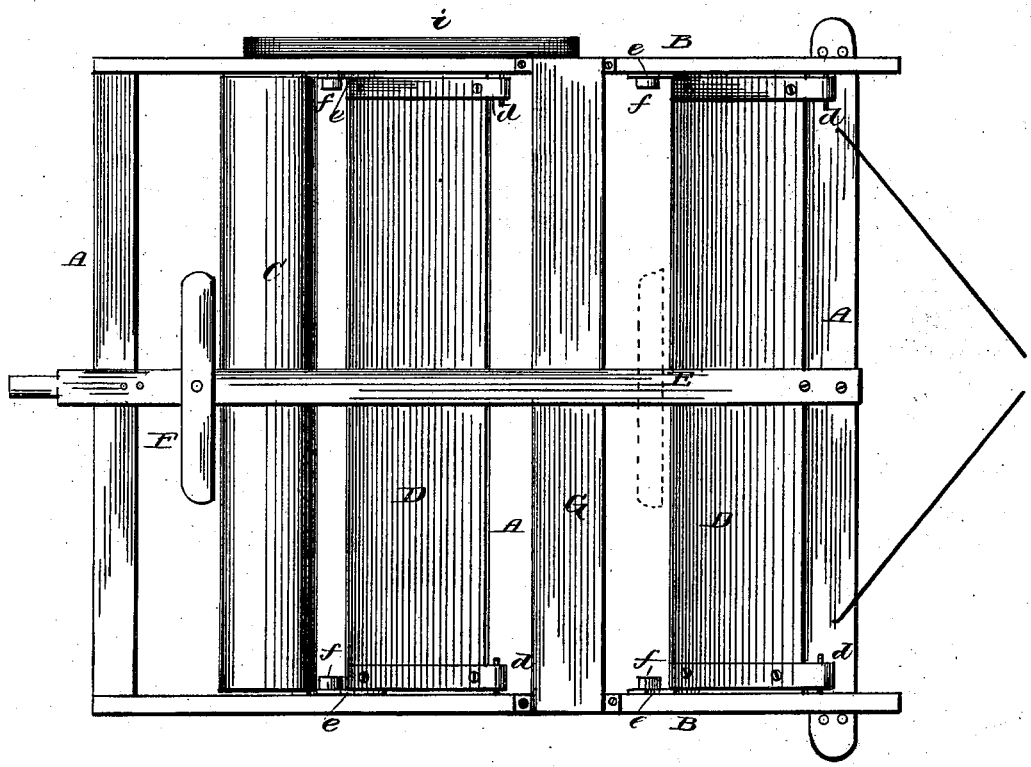
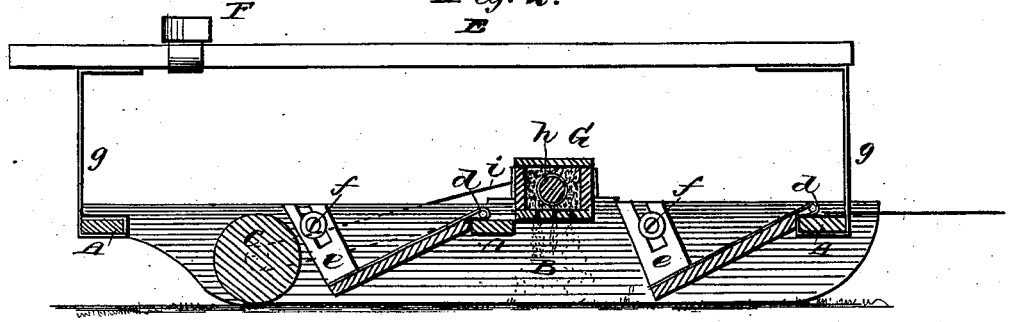

UNITED STATES PATENT OFFICE.

ROBERT A. RYNERSON, OF BOWEN'S PRAIRIE, IOWA.

IMPROVEMENT IN COMBINED LAND-ROLLER AND CLOD-CRUSHER.

Specification forming part of Letters Patent No. 210,150, dated November 19, 1878; application filed September 23, 1878.

*To all whom it may concern:*

Be it known that I, ROBERT A. RYNERSON, of Bowen's Prairie, in the county of Jones and State of Iowa, have invented certain new and useful Improvements in Combined Land-Roller and Clod-Crusher; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved combined land-roller and clod-crusher, and Fig. 2 is a vertical section thereof.

The same parts in the two figures are designated by the same letter.

This invention relates to certain improvements in combined clod-crusher and land-roller; and it consists in the employment, in connection with a frame having runners, of hinged adjustable crushing-boards and a roller, substantially as hereinafter more fully set forth.

In the drawings, A A refer to the end-pieces of the frame, to which are suitably connected the runners B B. C is the roller, adjusted in the rear part of the frame, consisting of the above-mentioned parts, and by which the plowed or loose ground is rolled smoothly whenever occasion requires. Among other occasions, it is desirable to roll or smooth the ground between and when the growing plants are just up.

D D are the clod-crushers, which may be one or more in number, and are hung or pivoted in position by looped straps *d d*, connected to the middle and one of the end cross-bars A A. These crushers, consisting of thick or stout boards, are suspended and secured in an inclined position by slotted upwardly-projecting plates *e e*, fastened to the said crushers or boards, and receiving set or adjusting screws *f f*, entering the inner sides of the runners, by which the angle of presentation of the crushers may be varied with reference to the ground. It is desirable to use the crushers D before the plants are up, to crush and pulverize the clods of the plowed ground, to level the same, and destroy weeds.

E is a horizontal bar or lever, mounted upon plates *g g*, with more or less elasticity, to act in the capacity of springs, which plates or springs are fastened at their lower ends to the end pieces of the frame. This bar, which is adapted at its rear end to be conveniently grasped with the hand or hands, acts in a twofold capacity—viz., as a lever for lifting the forward end of the machine in bringing additional weight on the roller, and vice versa, and, secondly, as a spring-support for the driver's seat, and to permit of the latter being moved back and forth thereon, in order to bring the weight of the driver, &c., either upon the roller or crushers, as occasion may require.

F is the driver's seat, clipped or otherwise so connected to the bar E as to permit of the sliding of the seat thereon to any desired point.

A seed dropping or planting attachment may be used in connection with my machine, consisting of the seed-box G, perforated in its bottom, and having a seed-dropping shaft or bar, *h*, operated by a belt, *i*, driven by the roller C.

This machine is very simple, easily constructed, and can be built at little expense, and is perfect in all its operations.

Having thus fully described my invention, I claim and desire to secure by Letters Patent of the United States—

The combined land-roller and clod-crusher, consisting of end pieces A, runners B, hinged adjustable crushing-boards D, and roller C, substantially as and for the purpose set forth.

In testimony that I claim the foregoing as my own I have hereunto affixed my signature in presence of two witnesses.

ROBERT A. RYNERSON.

Witnesses:
HORACE AVERILL,
WM. C. HURLBUTT.